United States Patent Office 3,317,569
Patented May 2, 1967

3,317,569
ESTERS OF MONOIODINATED BENZOYLOXY-
ALKANOIC ACIDS
Aubrey A. Larsen, Evansville, Ind., and James E. Siggins and James H. Ackerman, Bethlehem, N.Y., assignors to Sterling Drug Inc., New York, N.Y., a corporation of Delaware
No Drawing. Filed Mar. 1, 1963, Ser. No. 262,186
14 Claims. (Cl. 260—347.4)

This invention relates to esters of iodinated benzoic acids, and in particular is concerned with aliphatic esters of monoiodinated benzoyloxyalkanoic acids.

The preferred aspect of the invention relates to compounds of the formula

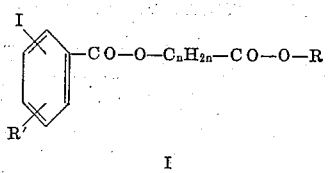

wherein R is a member of the group consisting of lower-alkyl, lower-alkenyl, lower-alkoxy-lower-alkyl and lower-alkylthio-lower-alkyl; R' is a member of the group consisting of hydrogen and lower-alkoxy; n is an integer from 2 to 7; and the iodine atom is in a position selected from meta and para with respect to the carboxyl group.

In the above Formula I, the group R preferably contains from one to about eight carbon atoms and stands for lower-alkyl, including such groups interrupted by oxygen or sulfur, or by a double bond (lower-alkenyl). In the above Formula I, the group R', when lower-alkoxy, preferably contains from one to about four carbon atoms.

The compounds of the invention are prepared by either of two general methods as follows.

(A) Reaction of a substituted benzoyl halide with an ester of a hydroxy acid:

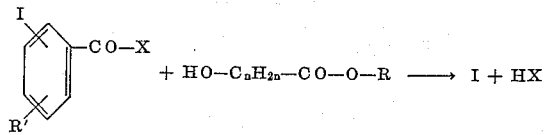

wherein X is halogen, preferably chlorine or bromine, and R, R' and n have the meanings given hereinbefore. The reaction takes place in the presence of a base such as aqueous alkali or an organic amine, tertiary amines, such as pyridine or triethylamine, being preferred.

(B) Reaction of a metal salt of a substituted benzoic acid with the ester of a halo acid:

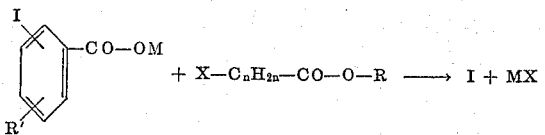

wherein M is a metallic cation, preferably an alkali metal, X is halogen, preferably chlorine or bromine, and R, R' and n have the meanings given hereinabove. The reaction takes place either by heating together the reactants directly, or with an inert solvent or reaction medium, for example dimethylformamide.

The structures of the compounds of the invention were established by the modes of their preparation, their chemical and physical properties, and by the fact that elementary analyses found were in agreement with the values calculated for the expected structures.

The compounds of Formula I, including compounds derived from any of the members of the groups defining R and R', are useful as X-ray contrast media, and in particular find application as myelographic agents (i.e., for visualization of the spinal canal). For this purpose the compounds in liquid form are injected cisternally into a vertebrate organism. This procedure allows visualization of the spinal cord structures. The compounds of the invention possess the advantage of being eliminated from the animal organism in periods ranging from a few weeks to a few months, whereas myelographic agents presently in use, such as ethyl 10-(p-iodophenyl)undecylate, require much longer periods for elimination.

A few of the compounds of the invention are obtained in the form of low melting solids. These however, can be rendered liquid and applicable for myelography by admixture with a physiologically acceptable oil or with another member of the series which lowers the melting point below the ambient temperature.

The invention is illustrated by but not limited to the following examples.

EXAMPLE 1

Method A–1: Acid chloride and hydroxy-ester
in presence of pyridine

Propyl 3-(3-iodobenzoyloxy)propanoate 3-iodobenzoyl chloride (61 g.) was added over a period of 3 minutes to 150 ml. of pyridine at 60° C. There was then added over a period of 20 minutes 37.1 g. of propyl 3-hydroxy-propanoate in 25 ml. of pyridine with external cooling of the reaction mixture to keep the temperature below 70° C. The reaction mixture was heated at 60–70° C. for four hours, and after standing overnight was poured into cold water. Concentrated hydrochloric acid was added until the mixture had pH 3 and the mixture was extracted with ether. The ether extracts were washed with 5% sodium bicarbonate solution, water and saturated sodium chloride solution, treated with anhydrous calcium sulfate and activated charcoal, and concentrated to remove the volatile solvent. The residue was distilled, collecting the fraction boiling at 129° C. (0.4 mm.), and redistilled, collecting the fraction boiling at 102–104° C. (0.1 mm.), to give 22 g. of propyl 3-(3-iodobenzoyloxy)propanoate, $n_D^{25}=1.5443$, viscosity $(25°)=28.94$ centistokes.

EXAMPLE 2

Method A–2: Acid chloride and hydroxy-ester
in presence of triethylamine

Butyl 3-(4-iodobenzoyloxy)propanoate

A mixture of 53.4 g. of 4-iodobenzoyl chloride, 32.1 g. of butyl 3-hydroxypropanoate, 27.4 ml. of triethylamine and 350 ml. of benzene was refluxed for 24 hours. The reaction mixture was worked up as described above in Example 1 and the product distilled to give butyl 3-(4-iodobenzoyloxy)propanoate, B.P. 137° C. (0.08 mm.), $n_D^{25}=1.5452$.

EXAMPLE 3

Method B–1: Sodium salt of acid and halo-ester without solvent propyl 4-(4-iodobenzoyloxy)butanoate A mixture of 67.5 g. of sodium 4-iodobenzonate and 62.7 g. of propyl 4-bromobutanoate was slowly warmed to reflux temperature and heated at reflux for nineteen hours. The reaction mixture was cooled, leached with 1 l. of chloroform and filtered. The chloroform solution was washed with water, 5% potassium carbonate solution, water and sodium chloride solution, dried over anhydrous calcium sulfate, and concentrated to remove the volatile solvent. The residue was distilled to give propyl 4-(4-iodobenzoyloxy)butanoate, B.P. 135° C. (0.02 mm.), $n_D^{25}=1.5475$, crystallizing to a solid, M.P. 38.8–42.0° C. (corr.).

EXAMPLE 4

*Method B–2: Sodium salt of acid and halo-ester in dimethylformamide*

Butyl 4-(3-iodobenzoyloxy)butanoate

Sodium 3-iodobenzoate (43.1 g.) and 320 ml. of dimethylformamide were heated to 100° C., and after one hour 35.6 g. of butyl 4-bromobutanoate was added. The reaction mixture was heated at 110° C. for 24 hours, then poured into ice-water and extracted with ether. The ether extracts were washed with water, 5% potassium carbonate solution, water and sodium chloride solution, dried over anhydrous calcium sulfate, and concentrated to remove the volatile solvent. The residue was distilled to give butyl 4-(3-iodobenzoyloxy)butanoate, B.P. 142° C. (0.03 mm.), $n_D^{25}$=1.5389.

The following compounds were also prepared according to the above procedures as indicated.

| Example | Name of Compound | Procedure |
|---|---|---|
| (5) | Propyl 3-(4-iodobenzoyloxy)propanoate | A-1 |
| (6) | 2-ethoxyethyl 3-(4-iodobenzoyloxy)propanoate | A-1 |
| (7) | 3-methoxybutyl 3-(4-iodobenzoyloxy)propanoate | A-1 |
| (8) | Ethyl 3-(4-iodobenzoyloxy)propanoate | A-2 |
| (9) | Propyl 2-(4-iodobenzoyloxy)propanoate | B-1 |
| (10) | Propyl 3-(4-methoxy-3-iodobenzoyloxy)propanoate | A-2 |
| (11) | Ethyl 4-(4-iodobenzyloxy)butanoate | B-2 |
| (12) | Butyl 4-(4-iodobenzoyloxy)butanoate | B-2 |
| (13) | Methyl 4-(4-iodobenzoyloxy)butanoate | B-2 |
| (14) | 3-methylbutyl 4-(4-iodobenzoyloxy)butanoate | B-2 |
| (15) | Butyl 5-(4-iodobenzoyloxy)pentanoate | B-2 |
| (16) | Tetrahydrofurfuryl 4-(4-iodobenzoyloxy)butanoate | B-2 |
| (17) | 2-ethoxyethyl 4-(4-iodobenzoyloxy)butanoate | B-2 |
| (18) | 2-methoxyethyl 4-(4-iodobenzoyloxy)butanoate | B-2 |
| (19) | Propyl 4-(3-iodobenzoyloxy)butanoate | B-2 |
| (20) | Propyl 6-(4-iodobenzoyloxy)hexanoate | B-2 |
| (21) | Allyl 4-(4-iodobenzoyloxy)butanoate | B-2 |
| (22) | Butyl 4-(3-iodo-4-methoxybenzoyloxy)butanoate | B-2 |
| (23) | 2-butoxyethyl 4-(4-iodobenzoyloxy)butanoate | B-2 |
| (24) | 2-methylmercaptoethyl 4-(4-iodobenzoyloxy)butanoate | B-2 |
| (25) | Pentyl 4-(4-iodobenzoyloxy)butanoate | B-2 |

*Physical properties*

| Example | B.P. °C. (mm. Hg) | M.P. °C. | $n_D^{25}$ | Viscosity (25°) cs. |
|---|---|---|---|---|
| (5) | 121–125 (0.02) | | 1.5512 | 30.12 |
| (6) | 144 (0.03) | | 1.5461 | 48.58 |
| (7) | 144 (0.02) | | 1.5462 | 54.76 |
| (8) | 113 (0.007) | | 1.5582 | 26.44 |
| (9) | 95 (0.007) | | 1.5468 | |
| (10) | 143 (0.01) | | 1.5575 | 305.62 |
| (11) | 123–127 (0.2) | | 1.5547 | |
| (12) | 143 (0.03) | 42 | 1.5422 | |
| (13) | 128–130 (0.04) | 28.8–29 | 1.5642 | |
| (14) | 150 (0.03) | 43.6–45.8 | 1.5379 | |
| (15) | 152 (0.06) | | 1.5391 | |
| (16) | 148 (0.01) | | 1.5591 | |
| (17) | 143 (0.009) | | 1.5450 | |
| (18) | 144 (0.009) | | 1.5509 | |
| (19) | 124 (0.01) | | 1.5430 | |
| (20) | 169 (0.05) | | 1.5386 | |
| (21) | 137 (0.20) | 40–40.5 | 1.5597 | |
| (22) | | 46.2–46.8 | | |
| (23) | 160 (0.01) | | 1.5338 | |
| (24) | 172 (0.03) | | 1.5758 | |
| (25) | 147 (0.05) | 24–26 | 1.5393 | |

The following intermediates were used in the foregoing preparations:

Propyl 3-hydroxypropanoate, B.P. 113° C. (29 mm.), $n_D^{26}$=1.4220, prepared from β-propiolactone and propanol in the presence of sodium hydroxide.

Butyl 3-hydroxpropanoate, B.P. 52° C. (0.03 mm.), $n_D^{25}$=1.4275, prepared from β-propiolactone and butanol in the presence of sodium hydroxide.

Propyl 4-bromobutanoate, B.P. 113–116° C. (26 mm.), $n_D^{25}$=1.4536, prepared from 4-bromobutanoic acid and propanol in the presence of hydrogen bromide.

2-Ethoxyethyl 3-hydroxypropanoate, B.P. 66–67° C. (0.05 mm.), $n_D^{25}$=1.4348, prepared from propiolactone and 2-ethoxyethanol in the presence of sodium hydroxide.

3-methoxybutyl 3-hydroxypropanoate, B.P. 80° C. (0.05 mm.), $n_D^{25}$=1.4371, prepared from propiolactone and 3-methoxy-1-butanol in the presence of sodium hydroxide.

Ethyl 3-hydroxypropanoate, $n_D^{25}$=1.4205, prepared from propiolactone and ethanol.

Propyl 2-bromopropanoate, B.P. 84–86° C. (29 mm.), $n_D^{25}$=1.4430, prepared from α-bromopropionic acid and propanol in the presence of hydrogen chloride.

Ethyl 4-bromobutanoate, B.P. 97–98° C. (17 mm.), $n_D^{25}$=1.4532, prepared from 4-bromobutanoic acid and ethanol in the presence of hydrogen bromide.

Butyl 4-bromobutanoate, B.P. 132–133° C. (25 mm.), $n_D^{25}$=1.4539, prepared from 4-bromobutanoic acid and butanol in the presence of hydrogen bromide.

Methyl 4-bromobutanoate, B.P. 87° C. (19 mm.), $n_D^{25}$=1.4577, prepared from 4-bromobutanoic acid and methanol in the presence of hydrogen bromide.

3-methylbutyl 4-bromobutanoate, B.P. 127° C. (14 mm.), $n_D^{25}$=1.4552, prepared from butyrolactone, isoamyl alcohol and hydrogen bromide.

Butyl 5-bromopentanoate, B.P. 134° C. (15 mm.), $n_D^{25}$=1.4560, prepared from 5-bromopentanenitrile and butanol in the presence of sulfuric acid.

Tetrahydrofurfuryl 4-bromobutanoate, B.P. 79° C. (0.04 mm.), $n_D^{25}$=1.4820, prepared from tetrahydrofurfuryl alcohol and 4-bromobutanoic acid.

2-ethoxyethyl 4-bromobutanoate, B.P. 136–138° C. (12 mm.), $n_D^{26}$=1.4598, prepared from butyrolactone, 2-ethoxyethanol and hydrogen bromide.

2-methoxyethyl 4-bromobutanoate, B.P. 129–132° C. (12 mm.), $n_D^{25}$=1.4608, prepared from butyrolactone, 2-methoxyethanol and hydrogen bromide.

Propyl 6-bromohexanoate, B.P. 143° C. (17 mm.), $n_D^{25}$=1.4525, prepared from 6-bromohexanenitrile and propanol in the presence of sulfuric acid.

Allyl 4-chlorobutanoate, B.P. 97° C. (16 mm.), $n_D^{25}$=1.4465, prepared from 4-chlorobutanoic acid and allyl alcohol in the presence of p-toluenesulfonic acid.

2-butoxyethyl 4-chlorobutanoate, B.P. 166° C. (27 mm.), $n_D^{25}$=1.4411, prepared from 4-chlorobutanoic acid and 2-butoxyethanol in the presence of p-toluenesulfonic acid.

2-methylmercaptoethyl 4-chlorobutanoate, B.P. 155° C. (27 mm.), $n_D^{25}$=1.4858, prepared from 4-chlorobutanoic acid and 2-methylmercaptoethanol in the presence of p-toluenesulfonic acid.

Pentyl 4-chlorobutanoate, B.P 118° C. (11 mm.), $n_D^{25}$=1.4371, prepared from 4-chlorobutanoic acid and amyl alcohol in the presence of p-toluenesulfonic acid.

Following the procedure of Example 4, the sodium salt of 4-iodo-2-methoxybenzoic acid or the sodium salt of 3-iodo-4-ethoxybenzoic acid can be caused to react with butyl 4-bromobutanoate to give, respectively, butyl 4-(4-iodo-2-methoxybenzoyloxy)butanoate or butyl 4-(3-iodo-4-ethoxybenzoyloxy)butanoate.

Following the procedure of Example 4, the sodium salt of 4-iodobenzoic acid can be caused to react with methyl 7-bromoheptanoate or methyl 8-bromooctanoate to give, respectively, methyl 7-(4-iodobenzoyloxy)heptanoate or methyl 8-(4-iodobenzoyloxy)octanoate.

We claim:
1. A compound of the formula

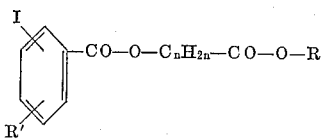

wherein R is a member of the group consisting of lower-alkyl, lower-alkenyl, lower-alkoxy-lower-alkyl, tetrahydrofurfuryl and lower-alkylthio-lower-alkyl; R' is a member of the group consisting of hydrogen and lower-alkoxy; $n$ is an integer from 2 to 7; and the iodine atom is in a position selected from meta and para with respect to the carboxyl group.

2. A compound of the formula

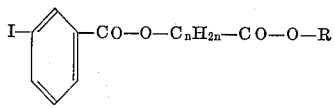

wherein R is lower-alkyl and $n$ is an integer from 2 to 7.

3. A compound of the formula

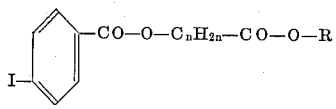

wherein R is lower-alkyl and $n$ is an integer from 2 to 7.

4. A compound of the formula

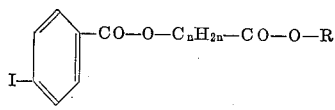

wherein R is lower-alkoxy-lower-alkyl and $n$ is an integer from 2 to 7.

5. Propyl 3-(4-iodobenzoyloxy)propanoate.
6. Butyl 3-(4-iodobenzoyloxy)propanoate.
7. Propyl 4-(4-iodobenzoyloxy)butanoate.
8. Propyl 3-(4-methoxy-3-iodobenzoyloxy)propanoate.
9. Butyl 4-(4-iodobenzoyloxy)butanoate.
10. Butyl 4-(3-iodobenzoyloxy)butanoate.
11. Butyl 5-(4-iodobenzoyloxy)pentanoate.
12. Tetrahydrofurfuryl 4 - (4 - iodobenzoyloxy)butanoate.
13. 2-butoxyethyl 4-(4-iodobenzoyloxy)butanoate.
14. 2-methylmercaptoethyl 4 - (4 - iodobenzoyloxy)butanoate.

References Cited by the Examiner

UNITED STATES PATENTS

| | | | |
|---|---|---|---|
| 3,013,052 | 12/1961 | Richter | 260—471 |
| 3,014,927 | 12/1961 | Garber et al. | 260—347.4 |
| 3,073,848 | 1/1963 | Wasson et al. | 260—347.4 |
| 3,097,229 | 7/1963 | Beaver et al. | 260—471 |

OTHER REFERENCES

Strain et al., J.A.C.S., vol. 64 (1942), pp. 1436–1440.

LORRAINE A. WEINBERGER, *Primary Examiner.*

IRVING MARCUS, *Examiner.*

HENRY R. JILES, SIDNEY B. WILLIAMS, Jr.,
*Assistant Examiners.*